Oct. 22, 1963 M. J. BUERGER 3,108,185
PRECESSION INSTRUMENT FOR USE IN THE PHOTOGRAPHY
OF THE RECIPROCAL LATTICE OF A CRYSTAL
Filed June 22, 1960 5 Sheets-Sheet 1
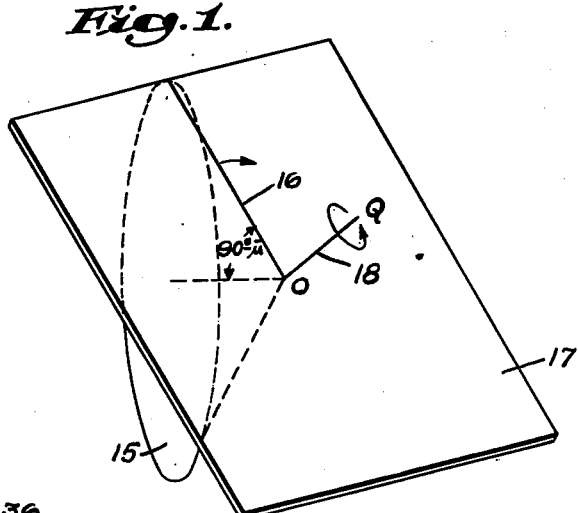
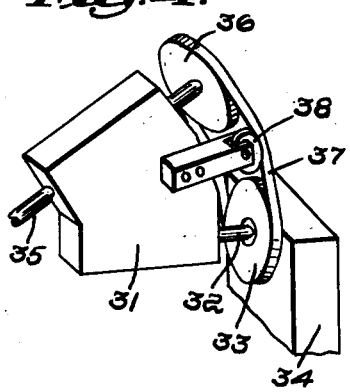
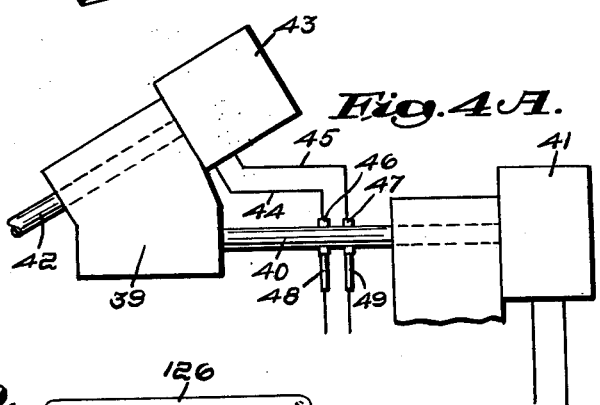
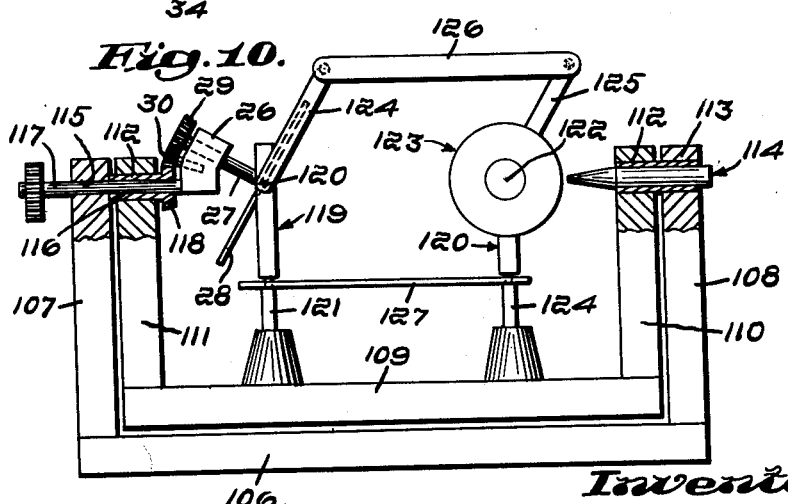
Inventor:
Martin J. Buerger,
by Albert H...
Attorney Oct. 22, 1963 M. J. BUERGER 3,108,185
PRECESSION INSTRUMENT FOR USE IN THE PHOTOGRAPHY
OF THE RECIPROCAL LATTICE OF A CRYSTAL
Filed June 22, 1960 5 Sheets-Sheet 2

Inventor:
Martin J. Buerger,
by A.L.H. Spear,
Attorney

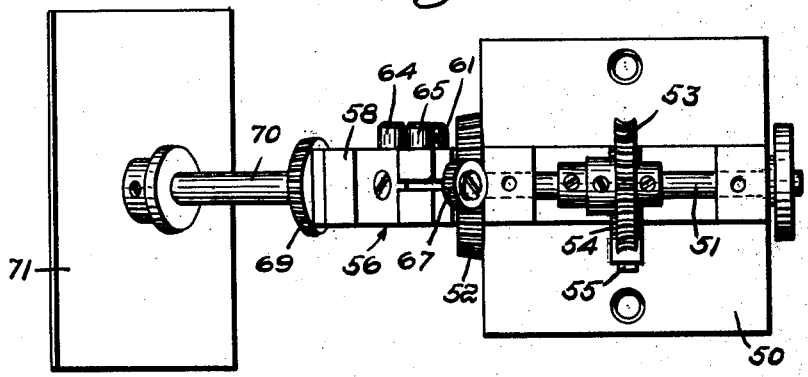
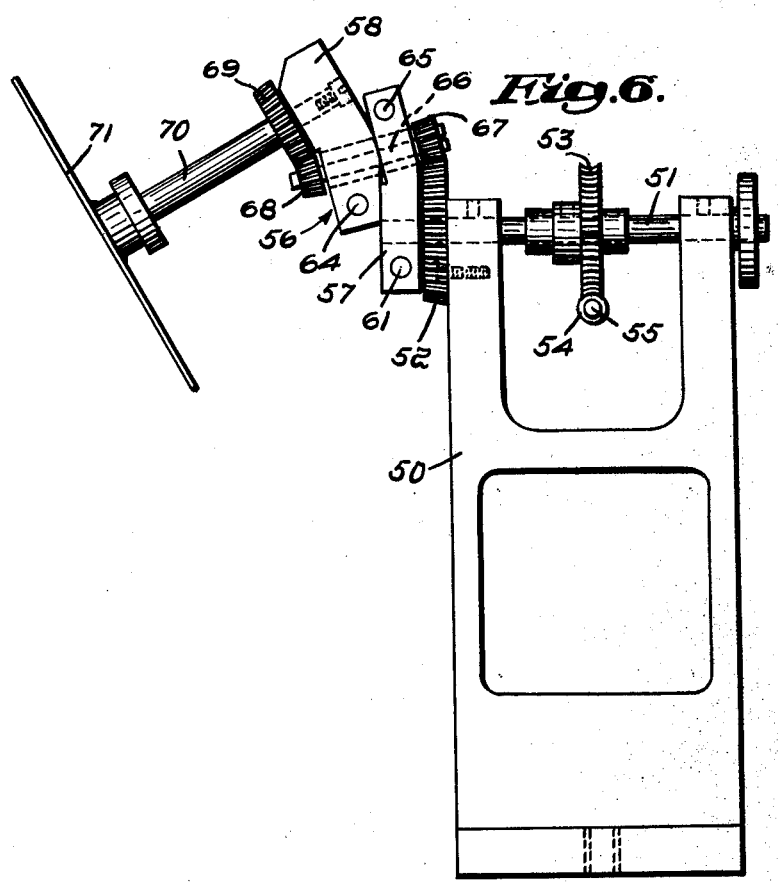

Inventor:
Martin J. Buerger,
by [signature],
Attorney

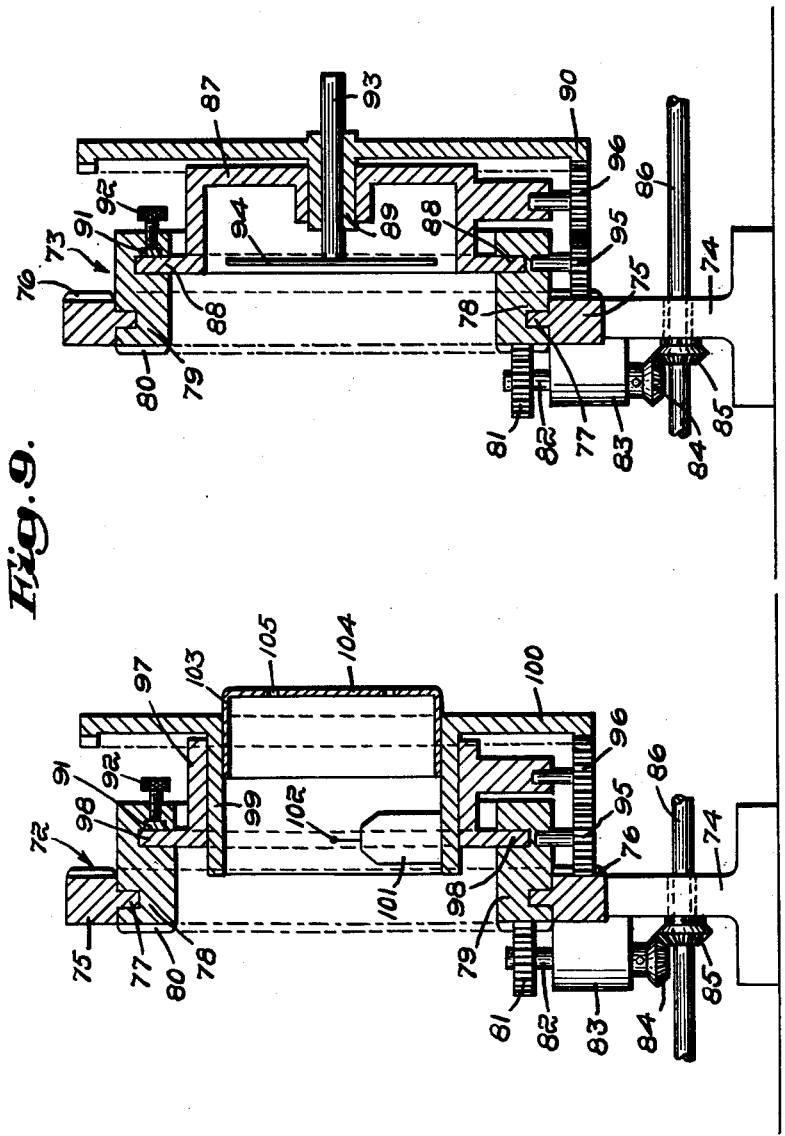

United States Patent Office 3,108,185
Patented Oct. 22, 1963

3,108,185
PRECESSION INSTRUMENT FOR USE IN THE PHOTOGRAPHY OF THE RECIPROCAL LATTICE OF A CRYSTAL
Martin J. Buerger, Weston Road, Lincoln, Mass.
Filed June 22, 1960, Ser. No. 38,079
19 Claims. (Cl. 250—51.5)

The present invention relates to precession instruments and particularly to such instruments for use in the photography of the reciprocal lattice of a crystal, plane by plane.

Precession instruments have been in use for more than twenty years during which period their design has remained virtually unchanged. In each such instrument, the crystal and the film are supported by universal joints and while these are so interconnected as to maintain the plane of the film and the plane of the reciprocal lattice parallel at all times and result in photographs being obtained which are satisfactory as far as spot locations are concerned, they are responsible for distortions in intensity making corrections necessary. Such distortions are attributable to the fact that the two axes of each universal joint restrict the proper orientation and motion of the planes.

The principal object of the present invention is to provide precession instruments with a new motion which not only enables the reciprocal lattice to be perfectly photographed but also ensures that the weights of the photographed points are so recorded that the symmetry of the photographed plane is not degraded as with present instruments.

In accordance with the present invention, a motion is characterized by two parts, in one of which the zero plane of the reciprocal lattice being photographed is moved as if it had rolling tangential contact with an imaginary cone along a generator of that cone, the center of the zero plane remaining fixed at the apex of the cone and with the generator migrating about the cone at a constant angular rate, and in the other of which, the plane is rotated about its normal in an opposite direction at a constant rate. The two parts of the motion are so related that each point of the plane makes contact with a particular point on the imaginary cone on each cycle. The plane of the photographic film, when set to photograph the zero plane of the reciprocal lattice, undergoes an exactly parallel motion.

Other objectives of the invention are to provide a range of suitable drives for imparting such a motion to the members of precession instruments defining the zero plane of the reciprocal lattice, including those that may be interconnected by linkage and those that may have a common drive shaft.

In the accompanying drawings, there are shown illustrative embodiments of the invention from which these and other of its objectives, novel features and advantages will be apparent.

In the drawings:

FIG. 1 is a schematic view illustrating the precession motion;

FIG. 4 is a fragmentary view showing an alternative drive producing the same motion as the drive shown in FIGS. 2 and 3;

FIG. 4A is a similar view of another alternative drive;

FIG. 5 is a plan view of another modification of the invention;

FIG. 6 is a side view thereof;

FIG. 9 is a partly sectioned side view of a pair of units illustrating another embodiment of the invention, and FIG. 10 is a partly sectioned side view showing yet another embodiment of the invention.

In FIG. 1, there is shown a cone 15 having a half-opening angle of $90°-\bar{\mu}$ and a generator indicated by the line 16. A plane 17 is shown which may be that of the zero plane of the reciprocal lattice or that of the film holder set to photograph the zero plane of the reciprocal lattice. The plane 17 is shown as being tangent to the cone and the motion in accordance with the invention may be readily considered as resulting from the rolling of the plane 17 about the cone 15 while rotating the plane 17 about the normal indicated at 18 but in the opposite direction. Such motion results in the generator 16 migrating at the constant angular rate $\omega$ and correct precession motion follows when the rotation of the plane 17 is at the constant rate $(1-\sin \bar{\mu})\omega$.

Figure 2:
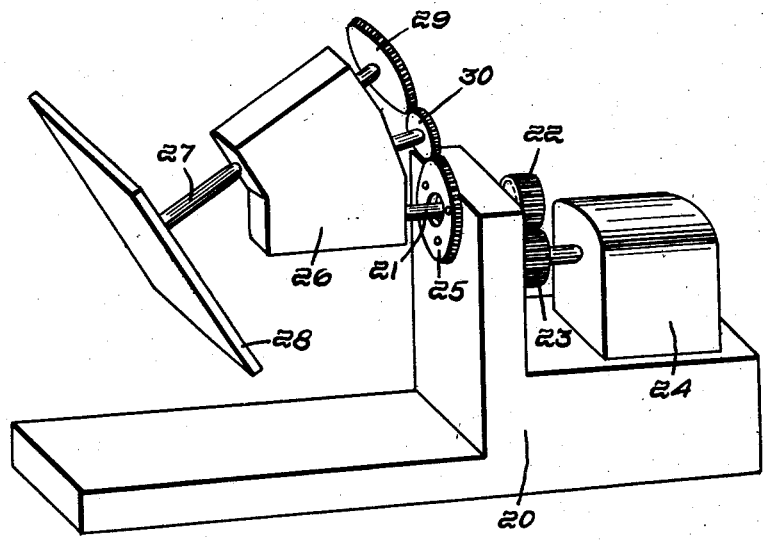
FIG. 2 is a perspective view of a drive for producing such a motion in the film holder set to photograph the zero plane of the reciprocal lattice.
Figure 3:
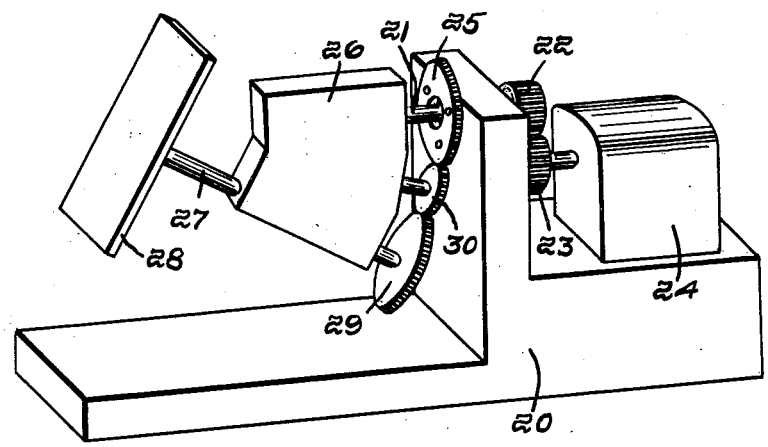
FIG. 3 is a similar view thereof but with the precession cycle 180° from that shown in FIG. 2.

In FIGS. 2 and 3, there is illustrated one embodiment of a drive in accordance with the invention and shown as having a base 20 rotatably supporting a shaft 21 having a gear 22 on its rear end in mesh with the gear 23 on the drive shaft of the motor 24. The base 20 has a fixed gear 25 concentric with the shaft 21 and a body 26 is fast on the front end of the shaft 21. The body 26 rotatably supports a shaft 27 whose axis is forwardly inclined to intersect the axis of the shaft 21 at the center of the film on the film holder 28 when set to photograph the zero plane of the reciprocal lattice. The film holder 28 is suitably secured to the front end of the shaft 27, preferably so that it may be adjusted parallel to itself along the shaft 27. The gear 29 fast on the rear end of the shaft 27 meshes with an idler gear 30 rotatably mounted on the body 26 and meshing with the fixed gear 25.

The axis of the shaft 21 defines the path of the X-ray beam and, with reference to FIG. 1 and from a comparison of FIGS. 2 and 3, it will be noted that as the shaft 21 rotates, the plane of the film holder 28 is in rolling tangential contact with an imaginary cone and the shaft 27 is a normal to said plane. The imaginary cone has a half opening angle of $90°-\bar{\mu}$ and the plane rolls tangentially about such an imaginary cone with a generator of the cone migrating at the constant rate $\omega$. At the same time, the shaft 27 rotates oppositely to the direction in which the plane is rolling to establish the desired precessional motion.

As illustrated by FIG. 4, a similar instrument may be provided in which the body 31 is fast on a drive shaft 32 which is concentric with a fixed, pulley-like member 33 carried by the base 34. The shaft 35 is similar to the shaft 27 except that is carries a pulley-like member 36 at its rear end with the members 33 and 36 having an endless connector 37 trained about them and over suitable idler pulleys 38 mounted on the body 31. In all other respects, the drive of FIG. 4 is similar to that of FIGS. 2 and 3.

The two parts of the motion in accordance with the invention can, of course, be effected by separate but suitably synchronized means and, as illustrative thereof, there is shown in FIG. 4A a body 39 fast on a shaft 40, similar in function to the shaft 21 and the shaft 32, and driven by the synchronous motor 41. The shaft 42 is rotatably supported by the body 39 and is similar in function to the shaft 27 and the shaft 35 but it is driven by a synchronous motor 43 having leads 44 and 45 connected to ring contacts 46 and 47 respectively. Suitable brushes are indicated at 48 and 49 for engagement with the ring contacts 46 and 47, respectively.

In FIGS. 5-8, another embodiment of the invention is shown as having a supporting base 50 for a drive shaft 51 whose axis is in alinement with the path of the X-ray beam. The shaft 51 which is concentric with a fixed gear 52, may be driven in any desired way and is shown as having a worm gear 53 meshing with a worm 54 on the shaft 55.

The generally indicated body 56 includes a first section 57 and a second section 58. The first section has forked ends 59 and 60 and the shaft 51 is received between the ends 59 which are clamped thereto as by means of the clamping screws 61. The body section 58 has a forked end 62 and a sleeve 63 is clamped therebetween by the clamping screw 64 and between the forked end 60 of the section 57 by the clamping screw 65. A shaft 66 extends through the sleeve 63 and is provided at its rear end, with a gear 67 meshing with the fixed gear 52 and, at its front end, with a gear 68 meshing with a gear 69 on the shaft 70 rotatably carried by the second section 58. The ratio between the gears 52 and 67 is the same as that between the gears 69 and 68.

It will be noted that the shaft 66 is inclined to intersect the axis of the shaft 51 centrally of film, not shown, but whose plane is represented by the plate 71, when set to photograph the zero plane of the reciprocal lattice. The plate in the location indicated by 71 is fast on and may be adjusted along the shaft 70. The axis of the shaft 70 is also inclined to intersect the axes of the shafts 51 and 66 at their points of intersection.

Figure 7:
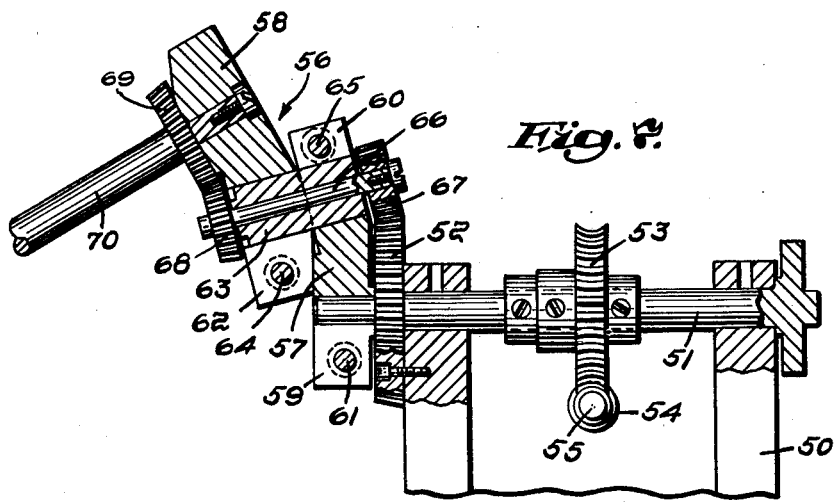
FIG. 7 is a section through the body, on an increased scale, showing it adjusted to a position wherein the angle between the axis about which the normal to the plane is moved, and the axis defined by the normal is at the maximum.
Figure 8:
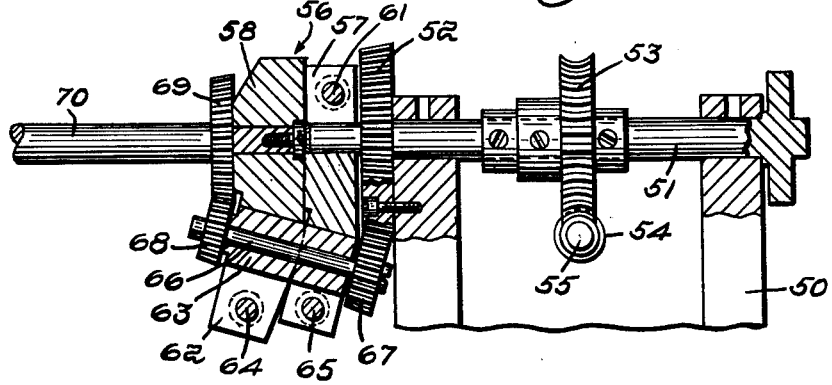
FIG. 8 is a like view showing the angle reduced to zero.

It will be noted that the two sections are so formed and disposed that the second section 58 may be swung about its pivotal connection with the first section 56 when the clamping screw 64 is loosened and locked thereby in any angular position relative thereto. In FIG. 7, the second section 58 has been swung to define the maximum angle between the axis of the shaft 51 and that of the shaft 70, while in FIG. 8 the second section is shown as swung through 180° into a position where the shaft 70 is in axial alinement with the shaft 51. The sections may be adjusted to establish any angle within the range of from 0° to the maximum permitted angle.

In the operation of an instrument in accordance with this embodiment of the invention, the same precession motion results and is characterized by the rolling of the plane in one direction about an imaginary cone having a half opening angle of $90°-\bar{\mu}$, the migration of a generator of that cone at the constant angular rate of $\omega$ and the rotation of the plane about a normal, the shaft 70, in the other direction and at the constant rate of $(1-\sin\bar{\mu})\omega$.

In the embodiment of the invention illustrated by FIG. 9 there are shown two units, generally indicated at 72 and 73. These units are partly similar in that each has a base 74 for an annular support 75 having on its rear face an annular series of rack teeth 76. The support 75 is shown as having a rib 77 entrant of a channel 78 in the periphery of an annular element 79 whereby the element 79 may be rotated and, for that purpose, the front face of the element 79 is provided with an annular series of rack teeth 80. A gear 81 on the upper end of a shaft 82 meshes with the rack teeth 80. The shaft 82 is mounted as at 83 on the base 74 and has a bevel gear 84 in mesh with a like gear 85 on the shaft 86 which drives both units.

The unit 73 has a mount 87 connected to the annular element 79 by diametrically opposed pivots 88 and it rotatably supports the hub 89 of a ring gear 90. A brake 91 may be applied as by means of a set screw 92 so that the mount 87 may be pivoted and locked in a desired position. The hub 89 carries the supporting member 93 for the plate 94 which is indicative of any suitable film holder and the axis of the member 93 intersects the axis of the pivots 88. The member 93 may be moved forwardly or rearwardly relative to the hub 89 as required for the positioning of the film holder 94. The annular element 79 and the mount 87 carry intermeshing idler gears 95 and 96 with the gear 95 meshing with the rack teeth 76 and the gear 96 meshing with the ring gear 90.

The unit 72 is provided with a mount 97 having diametrically opposed pivots 98 connecting it to its annular element 79 and the mount 97 receives the hub 99 of an annular ring gear 100. The hub 99 supports a conventional crystal holder 101 positioning the crystal 102 in the axis of the pivots 98 and axially of the element 79. The hub 99 also slidably receives a sleeve 103 at whose rear end there is a conventional layer-line screen 104 having an annular exit 105 and which is adjusted by sliding it toward or away from the crystal 102. The ring gear 100 is part of a gear train including the idler gears 95 and 96 and the rack teeth 76.

It will be appreciated that, in the unit 72, when the holder is turned relative to the axis of its pivots, the motion in accordance with the invention results, providing that each point of the zero plane of the reciprocal lattice makes contact with a particular point on the imaginary cone on each cycle and that the plane of the photographic film in the unit 73, when set to photograph the zero plane of the reciprocal lattice, undergoes an exactly parallel motion.

In the embodiment of the invention illustrated by FIG. 10, a base 106 is shown as having end brackets 107 and 108 between which is located a cradle 109 having brackets 110 and 111. The base bracket 108 has a tubular member 112 which serves as a bearing for rotatably supporting the cradle bracket 110 and said bracket 110 has an alined bore 113 so that a collimator, generally indicated at 114, may be inserted therethrough. The base bracket 107 has a bore 115 and a tubular support 116, in axial alinement therewith, serving to support the other cradle bracket 111 and permitting the drive shaft 117 to extend therethrough for rotation independently thereof.

The shaft 117 is shown as having a unit in accordance with the invention attached thereto, such as the unit of FIGS. 2 and 3 with a fixed gear 118 on the proximate end of the support 116 in mesh with the idler gear 30 of that unit.

The cradle 109 is shown as having a pair of universal joints, generally indicated at 119 and 120. The universal joint 119 has transversely alined pivotal connections 120 with the film holder 28 and its vertical pivot is defined by its supporting post 121. The universal joint 120 has transversely alined pivots 122, which support the generally indicated and conventional crystal mount whose adjusting dial is shown at 123, and its vertical pivot is defined by its supporting post 124. The pivots 120 and 122 carry arms 124 and 125, respectively, and these are connected to opposite ends of a link 126 by pivots of the ball and socket type as is conventional with existing instruments. The universal joints are also pivotally connected by a link 127 for actuation in response to movements relative to the vertical axes of the universal joints. Such joints in support of and linkage between the crystal mount and film holder are conventional but in accordance with the present invention, they may be employed without distortions in the photographs resulting since the cradle 109 is free to swing to prevent the axes of the universal joints 119 and 120 from restricting the accurate orientation and motion of the planes.

I claim:

1. A precession motion including means to effect the rolling of a plane tangent to an imaginary cone along a generator thereof, and means to effect the migration of said generator at a constant angular rate and the rotation of said plane with respect to its normal at a constant rate but in a direction opposite to that in which it is rolled, said rates being so related that each point of the plane makes contact with a particular point on said imaginary cone on each cycle.

2. A precession motion, said motion being characterized by the rolling of a plane tangent to an imaginary cone along a generator thereof, said cone having a half opening angle of $90° - \bar{\mu}$, said rolling being attended by the migration of said generator at a constant angular rate $\omega$ and the rotation of said plane with respect to its normal at a constant rate $(1-\sin \bar{\mu})\omega$ but in a direction opposite to that in which it is rolled.

3. In a precession motion, means to impart motion to a plane to effect its rolling tangentially with respect to an imaginary cone along a generator thereof, said cone having a half opening angle of $90° - \bar{\mu}$, the resulting motion being attended by the migration of said generator at the constant angular rate $\omega$, and means simultaneously to rotate said member at the constant rate of $(1-\sin \bar{\mu})\omega$ in a direction opposite to that in which the plane is rolled.

4. In a precession motion, a rotatable member, means to impart motion to said member so as to cause a plane to which said member is a normal to have rolling tangential contact with an imaginary cone along a generator thereof, said cone having a half opening angle of $90° - \bar{\mu}$, such rolling contact being attended by the migration of said generator at the constant angular rate $\omega$, and means simultaneously to rotate said member at the constant rate of $(1-\sin \bar{\mu})\omega$ in a direction opposite to that in which the plane is rolled.

5. In a precession instrument having a first axis, a rotatable member disposed with its axis intersecting said first axis, and a drive including means to effect the travel at a constant rate of said member about said first axis in one direction and means to effect the rotation of said member about its axis in the opposite direction, said drive establishing a motion characterized by the rolling of a plane to which the axis of said member is a normal tangent to an imaginary cone along a generator thereof, said cone having a half opening angle of $90° - \bar{\mu}$, said rolling being attended by the migration of said generator at the constant angular rate $\omega$ and the simultaneous rotation of said plane with respect to the axis of said member at the constant rate $(1-\sin \bar{\mu})\omega$ in a direction opposite to the rolling of said plane.

6. In a precession instrument having a first axis, a rotatable member disposed with its axis intersecting said first axis, and a drive including a synchronous motor to effect the travel at a constant rate of said member about said first axis in one direction and a synchronous motor to effect the rotation of said member about its axis in the opposite direction, said drive establishing a motion characterized by the rolling of a plane to which the axis of said member is a normal tangent to an imaginary cone along a generator thereof with each point of the plane making contact with a particular point on the imaginary cone on each cycle.

7. In a precession instrument, a first rotatable element, a second rotatable element supported by said first element for rotation independently thereof and with its axis eccentric with respect to and inclined to intersect the axis of the first element, a fixed member with which the axis of the first member is concentric, a drive including means operable to rotate said first element thus to carry said second element about the axis of the first element in one direction, and means connecting said second element to said fixed member and operable to rotate said second element about its axis in the opposite direction, said drive being characterized by the rolling of a plane to which the axis of the second element is a normal tangent to an imaginary cone along a generator thereof, said cone having a half opening angle of $90° - \bar{\mu}$, said rolling being attended by the migration of said generator at a constant angular rate $\omega$, and the rotation of said plane with respect to its normal at a constant rate $(1-\sin \bar{\mu})\omega$.

8. The instrument of claim 7 in which the means connecting the second element to the fixed member is an endless connection.

9. The instrument of claim 7 in which the means connecting the second element to the first member is a gear train.

10. In a precession instrument, a first shaft, a second shaft, a body fast on said first shaft and rotatably supporting said second shaft with its axis inclined to intersect the axis of the first shaft, a fixed gear with which the axis of the first shaft is concentric, a drive including means operable to rotate said first shaft thus to carry said second shaft about the axis of the first shaft in one direction, and means connecting said second shaft to said fixed gear and operable to rotate said second element about its axis in the opposite direction, said last named means including a gear on the end of said second shaft, and an idler carried by said body and in mesh with said second shaft and fixed gears, said drive being characterized by the rolling of a plane to which the axis of said second element is a normal tangent to an imaginary cone along a generator thereof, said cone having a half opening angle of $90° - \bar{\mu}$, said rolling being attended by the migration of said generator at a constant angular rate $\omega$, and the rotation of said plane with respect to its normal at a constant rate $(1-\sin \bar{\mu})\omega$.

11. In a precession instrument, a first shaft, a fixed gear with which said first shaft is concentric, a second shaft including a gear, a body including first and second sections, said first section being fast on said first shaft, said second shaft being rotatably supported by said second section, a shaft pivotally interconnecting said body sections, means to lock said sections against being turned about the axis of said connecting shaft, said connecting shaft having its axis so spaced and being inclined to intersect the first shaft axis at a point and said second shaft axis being so inclined that said second section may have a first position in which said first and second shaft axes are alined and may be swung therefrom through 180° with the angle of said first and second shaft axis increasing to a maximum but intersecting at said point, gears on said connecting shaft, one meshing with said fixed gear and one meshing with said second shaft gear, the rotation of said first shaft carrying said second shaft about its axis in one direction and being attended by a motion characterized by the rolling of a plane to which the axis of said second shaft is a normal tangent to an imaginary cone along a generator thereof, said cone having a half opening angle of $90° - \bar{\mu}$, said rolling being attended by the migration of said generator at a constant angular rate of $\omega$ and the rotation of said plane and said second shaft at a constant rate $(1-\sin \bar{\mu})\omega$.

12. In a precession instrument, an annular support, an annular element mounted for rotation within said annular support, means to rotate said element in one direction, mounting means including a member and adjustably supported by said annular element to enable the axis of said member to be disposed at an angle intersecting the axis of said annular element, means to rotate said member in the other direction, the rotation of said element carrying said member about the axis of the element and the rotation of said member being attended by a motion characterized by the rolling of a plane, to which the axis of said member is a normal, tangent to an imaginary cone along a generator thereof, said cone having a half opening angle of $90° - \bar{\mu}$, said rolling being attended by the migration of said generator at a constant angular rate of $\omega$ and the rotation of said plane and said second shaft at constant rate $(1-\sin \bar{\mu})\omega$.

13. In a precession instrument, an annular support including on one face an annular series of rack teeth, an annular element mounted for rotation within said annular support, means to rotate said element in one direction, mounting means including a member and adjustably supported by said annular element to enable the axis of said member to be disposed at an angle intersecting the axis of said annular element, said member including a ring gear, a pair of meshing idler gears, one carried by said element and meshing with the rack teeth of the support, and the other carried by said mount and meshing with said ring gear, the rotation of said element carrying said member about the axis of the element and the rotation of said member being attended by a motion characterized by the rolling of a plane, to which the axis of said member is a normal, tangent to an imaginary cone along a generator thereof, said cone having a half opening angle of $90° - \bar{\mu}$, said rolling being attended by the migration of said generator at a constant angular rate of $\omega$ and the rotation of said plane and said second shaft at a constant rate $(1-\sin \bar{\mu})\omega$.

14. In a precession instrument, an annular support, an annular element mounted for rotation within said annular support and including an annular series of rack teeth, a gear train meshing with said rack teeth of said annular element and operable to rotate said element in one direction, mounting means including a member and adjustably supported by said annular element to enable the axis of said member to be disposed at an angle intersecting the axis of said annular element, means to rotate said member in the other direction, the rotation of said element carrying said member about the axis of the element in one direction and the rotation of said member being attended by a motion characterized by the rolling of a plane, to which the axis of said member is a normal, tangent to an imaginary cone along a generator thereof, said cone having a half opening angle of $90° - \bar{\mu}$, said rolling being attended by the migration of said generator at a constant angular rate of $\omega$ and the rotation of said plane and said second shaft at a constant rate $(1-\sin \bar{\mu})\omega$.

15. In a precession instrument, an annular support, an annular element mounted for rotation within said annular support, means to rotate said element in one direction, mounting means including a member and adjustably supported by said annular element to enable the axis of said member to be disposed at an angle intersecting the axis of said annular element and being movable forwardly and rearwardly with respect thereto, the rotation of said element carrying said member about the axis of the element in one direction and the rotation of said member being attended by a motion characterized by the rolling of a plane to which the axis of said second shaft is a normal, tangent to an imaginary cone along a generator thereof, said cone having a half opening angle of $90° - \bar{\mu}$, said rolling being attended by the migration of said generator at a constant angular rate of $\omega$ and the rotation of said plane and said second shaft at a constant rate $(1-\sin \bar{\mu})\omega$.

16. The instrument of claim 15 in which the mount is in the form of a sleeve and the member is a sleeve within the first named sleeve and movable axially thereof, the last-named sleeve including a layer-line screen at one end thereof.

17. In a precession instrument of the type having a collimator defined path for an X-ray beam, a pair of units, one for positioning a crystal in said path and establishing the zero plane of a stack of planes of its reciprocal lattice and the other for mounting a film in a plane and including means operable to shift said film parallel to itself along its normal, and a drive for said units imparting to each plane a motion characterized by its rolling tangentially to an imaginary cone along a generator thereof at a constant angular rate $\omega$ and its rotation with respect to a normal thereof at a constant rate $(1-\sin \bar{\mu})\omega$ but in a direction opposite to that in which it rolls, and means for maintaining said planes in parallel during such motion.

18. In a precession instrument of the type having a collimator defined path for an X-ray beam, a drive shaft, a support, a cradle pivotally mounted in said support with its axis including said path and said drive shaft, a pair of units, one for positioning a crystal in said path and establishing the zero plane of a stack of planes of its reciprocal lattice, and the other for mounting a film in a plane, and including means operable to shift said film parallel to itself along its normal, each of said units including a universal joint mounted in said cradle, linkage interconnecting said units for maintaining said planes in parallel and means connected to said drive shaft for imparting motion to one of said units characterized by the rolling of its plane tangentially to an imaginary cone along a generator thereof, said cone having a half opening angle of $90° - \bar{\mu}$ with such rolling contact being attended by the migration of said generator at a constant angular rate $\omega$ and the rotation of said plane with respect to a normal thereof at a constant rate $(1-\sin \bar{\mu})\omega$ but in a direction opposite to that in which it rolls.

19. In a precession instrument of the type having a collimator defined path for an X-ray beam, a pair of units, one for positioning a crystal in said path and establishing the zero plane of a stack of planes of its reciprocal lattice and the other for mounting a film in a plane and including means for shifting said film plane parallel to itself along its normal, said planes being parallel, means operable to impart motion to the plane established by each unit characterized by the rolling of that plane tangentially about an imaginary cone along a generator thereof, said cone having a half opening angle of $90° - \bar{\mu}$, such rolling contact being attended by the migration of said generator at the constant angular rate of $\omega$, and means simultaneously to effect the rotation of said plate about its normal at the constant rate of $(1-\sin \bar{\mu})\omega$ in a direction opposite to that in which it rolls, at least the crystal positioning unit including an annular support, an annular element mounted for rotation within said support, mounting means including a normal defining member and adjustably supported by said annular element to enable the axis of said member to be disposed at an angle intersecting the axis of said annular element.

References Cited in the file of this patent

UNITED STATES PATENTS 2,854,222    Dening et al. _____ Sept. 30, 1958
2,928,945    Arndt _____ Mar. 15, 1960

OTHER REFERENCES

X-ray Crystal Structure, by McLachlin, McGraw-Hill Book Co., New York, 1957, pages 123 to 126.